US009338435B2

(12) United States Patent
Centen et al.

(10) Patent No.: US 9,338,435 B2
(45) Date of Patent: May 10, 2016

(54) GRID MODULATED SINGLE LENS 3-D CAMERA

(75) Inventors: Peter Centen, Goirle (NL); Klaas Jan Damstra, Breda (NL); Ben Van Den Herik, Oosterhout (NL); Frank Van Der Weegen, Steenbergen (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 1201 days.

(21) Appl. No.: 13/150,994

(22) Filed: Jun. 1, 2011

(65) Prior Publication Data

US 2012/0307019 A1 Dec. 6, 2012

(51) Int. Cl.
 *H04N 13/02* (2006.01)
(52) U.S. Cl.
 CPC .................................. *H04N 13/0207* (2013.01)
(58) Field of Classification Search
 CPC .. G03B 7/00; A61M 16/1045; A61M 16/106; A61M 16/20; A61M 2205/58; A61M 2205/584
 See application file for complete search history.

(56) References Cited

U.S. PATENT DOCUMENTS

| 5,416,510 | A * | 5/1995 | Lipton et al. ..................... 348/43 |
| 2005/0140820 | A1* | 6/2005 | Takeuchi et al. ............... 348/362 |
| 2010/0261961 | A1* | 10/2010 | Scott .................. A61B 1/00193 600/111 |
| 2011/0018974 | A1* | 1/2011 | Wang ............................... 348/49 |
| 2011/0033177 | A1* | 2/2011 | Kuroki ............................. 396/63 |

FOREIGN PATENT DOCUMENTS

WO 2011003168 A1 1/2011

OTHER PUBLICATIONS

International Preliminary Report on Patentability dated Dec. 2, 2013 re PCT/IB2012/001124, with Written Opinion dated Oct. 30, 2012.
Publication No. WO2012/164388 dated Dec. 6, 2012 re Application No. PCT/IB2012/001124, with International Search Report dated Oct. 30, 2012.
EP Communication received Nov. 17, 2015, regarding EP12741071.0.

* cited by examiner

*Primary Examiner* — Tat Chio
(74) *Attorney, Agent, or Firm* — Arent Fox LLP

(57) ABSTRACT

A camera includes a single lens configured to receive an optical image as two images from two viewing angles. The two images from respective viewing angles are converted into two orthogonally modulated images, each of the orthogonally modulated images corresponding to a different one of the two viewing angles. An image detector is configured to distinguishably detect the two orthogonally modulated images in a single frame. An image processor is configured to decode the two orthogonally modulated images in the single frame into two video signals corresponding to the two viewing angles. A method of imaging includes receiving an optical image from two viewing angles; converting the optical image into two orthogonally modulated images, each of the orthogonally modulated images corresponding to a different one of the viewing angles; distinguishably detecting in an image detector the two orthogonally modulated images in a single frame; and decoding in an image processor the two orthogonally modulated images in the single frame into two video output signals corresponding to the two viewing angles.

20 Claims, 4 Drawing Sheets

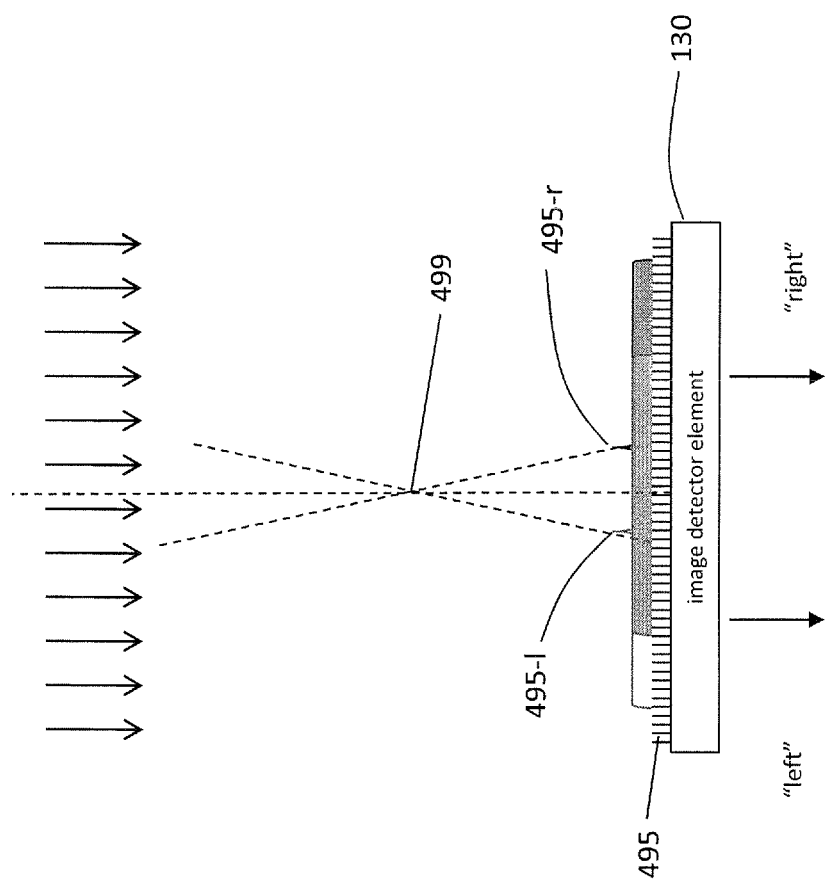

GRID MODULATED SINGLE LENS 3-D CAMERA

BACKGROUND

1. Field

This disclosure relates generally to video cameras, and more particularly to 3-D cameras.

2. Background

A number of approaches have been developed for 3-D image capture. These technologies typically seek to achieve stereoscopic images or a 2-D image plus a depth-map. Approaches may include a single camera or more than one camera. The use of two cameras or the use of two sets of lens systems to achieve 3-D parallax may impact the cost, complexity and bulkiness of such imaging systems. In addition, where two or more camera or optical beam systems are used, spatial tracking and alignment must be taken into account.

SUMMARY

In an aspect of the disclosure, a method of imaging includes receiving an optical image from two viewing angles in a single lens, filtering to convert the optical image into two orthogonally modulated images, each of the orthogonally modulated images corresponding to a different one of the viewing angles, distinguishably detecting in an image detector the two orthogonally modulated images in a single frame, and decoding in an image processor the two orthogonally modulated images in the single frame into two video signals corresponding to the two viewing angles.

In an aspect of the disclosure, a camera includes a lens configured to receive an optical image from two viewing angles. A filter is configured to convert the optical image into two orthogonally modulated images, each of the orthogonally modulated images corresponding to a different one of the viewing angles. An image detector is configured to distinguishably detect the two orthogonally modulated images in a single frame. An image processor is configured to decode the two orthogonally modulated images in the single frame into two video signals corresponding to the two viewing angles.

In an aspect of the disclosure, a camera includes a means for receiving light rays from a scene from two viewing angles through a single lens, a means for modulating the light rays from the two viewing angles into two orthogonally modulated portions, means for distinguishably imaging the two orthogonally modulated portions of the light rays in a single frame on the basis of the orthogonal polarization of the two portions, and means for decoding the two images from the single frame into signals corresponding to images from the two viewing angles.

In an aspect of the disclosure, a camera includes a lens configured to admit light rays from a scene, the lens having a left portion and a right portion, wherein the left and right portions have the same correspondence as a viewer's left eye and right eye, a pair of orthogonal modulators corresponding to the left and right lens portions arranged with the lens to bifurcate the light rays into a left group and a right group of two orthogonally modulated groups of rays, an image detector configured to distinguishably detect the two orthogonally modulated groups of rays in a single frame on the basis of the pair of orthogonal modulators, and an image processor configured to decode the two orthogonally modulated images in the single frame into two video signals corresponding to the light rays admitted to the left portion and right portion of the lens.

In an aspect of the disclosure, a camera includes means for receiving an optical image from two viewing angles, means for converting the optical image into two orthogonally modulated images, each of the orthogonally modulated images corresponding to a different one of the viewing angles, means for distinguishably detecting the two orthogonally modulated images, and means for decoding the two orthogonally modulated images in the single frame into two video signals corresponding to the two viewing angles.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this invention. Accordingly, the drawings and detailed description are to be regarded as illustrative in nature and not as restrictive.

BRIEF DESCRIPTION OF THE DRAWINGS

Various aspects of 3-D image capture are illustrated by way of example, and not by way of limitation, in the accompanying drawings, in which like references indicate similar elements, and in which:

FIG. 4 is a conceptual diagram of illustrating variable convergence in a 3-D digital imaging camera in accordance with the disclosure.

DETAILED DESCRIPTION

Figure 1:
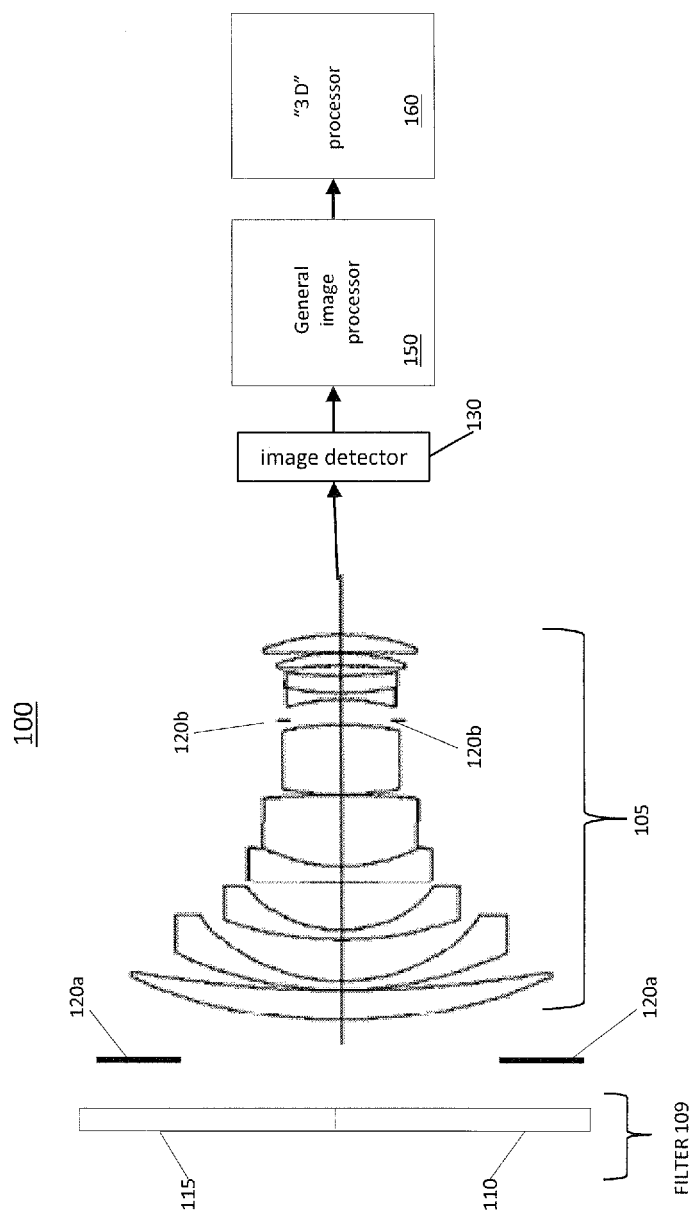
FIG. 1 is a conceptual diagram of an embodiment of a 3-D digital imaging camera in accordance with the disclosure.

The detailed description set forth below in connection with the appended drawings is intended as a description of various embodiments of the present invention. The invention, however, may be embodied in many different forms and should not be construed as limited to the various concepts presented throughout this disclosure. Rather, these concepts are provided so that this disclosure will be thorough and complete, and will fully convey the scope of the present invention to those skilled in the art. The detailed description includes specific details for the purpose of providing a thorough understanding of the invention. However, it will be apparent to those skilled in the art that the invention may be practiced without these specific details. In some instances, well-known structures and components are omitted in order to avoid obscuring the concepts of the invention.

Various concepts will now be presented with reference to a 3-D camera. The 3-D camera may be a stand-alone system, or it may be incorporated in any number of systems that may include image functionality, such as cellular phones, digital cameras, personal digital assistants, video games, computers, medical imaging instrumentation, etc. Furthermore, as those skilled in the art will readily appreciate, these concepts may be extended to other devices for 3-D image capture. By way of example, various concepts presented throughout this disclosure may be extended to acoustic imaging, electron microscope imaging, x-ray imaging, proton or other charged particle imaging, or any other suitable device, where the acoustic, electron, photon, x-ray or particle beam used in imaging is capable of polarization and a detector is capable of polarization dependent detection of such beams. Accordingly, any reference to a specific optical camera or other device is intended to illustrate the various aspects of the present invention, with the understanding that these aspects have a wide range of application, using wide ranging forms of amplitude modulated signals for imaging.

Various aspects of an apparatus and method of using will be presented for 3-D image capture to obtain in a single image frame, utilizing filtering, a left and right image each having different views of an object scene. Signal processing, either in the image detector or a subsequent image processing component may be used to decode the frame to provide the left and right images separately.

In imaging by a human viewer, light rays entering the left eye and right eye of a viewer coming from a different view of a scene. This parallax is mimicked in a 3-D camera using a single camera lens system. Advantage may be taken of a lens system having a specified aperture by dividing the aperture into left and right portions, or sub-apertures. The scene corresponding to each portion may be filtered with a corresponding modulator, where the two modulators are orthogonal to each other. Thus, the lens may be divided to provide two fields of view (e.g., as seen through the left and right portions of the lens) of a scene according to each of the two orthogonal modulators. An imaging detector element, such as a CMOS array, CCD array, phototransistor array, or equivalents, maybe modified to receive both orthogonally modulated images in a single frame, as described below, where the two images may be decoded and separated.

Various forms of modulation are possible. For example, light rays from a scene may be amplitude modulated when passing through a Ronchi pattern, also referred to as a Ronchi grid or Ronchi pattern. A Ronchi grating consists of alternate dark and clear stripes, behaving as a square wave transmission screen, producing an amplitude modulated pattern in the far field. Another example is a phase grating, which can be produced by as a sinusoidally embossed pattern a transparent substrate (phase diffraction grating), or an acousto-optic modulator, which modulated the optical index of a transparent medium by using high frequency acoustic waves. Both methods of modulation are well known in the art. For the sake of clarity in the following description, amplitude modulation, such as can be provided with a Ronchi pattern, will be given as an example, although other forms of modulation are implied within the scope of the disclosure.

For ease of description, a lens may be described as having a left portion and a right portion (as conventionally defined in the sense of a person having a left eye and a right eye) which may be equal halves, and which are therefore defined by a virtual boundary down a vertical the center of the lens as viewed looking toward a scene being imaged. Other bifurcations of the lens than equal portions may be considered to be within the scope of this disclosure. The lens may be a single lens, or a compound lens, which is common in the art of camera optics.

Referring to FIG. 1, a camera 100 includes a lens 105. The lens 105 may be a single lens or a compound lens, as shown in FIG. 1. A filter 109, comprising a left Ronchi screen 110 opposite a left portion of the lens 105 and a right Ronchi screen 115 opposite a right portion of the lens 105, may be placed at any of several locations within the camera. In FIG. 1, the filter 109 is shown between the lens 105 and the scene being viewed by the camera 100.

Figure 2:
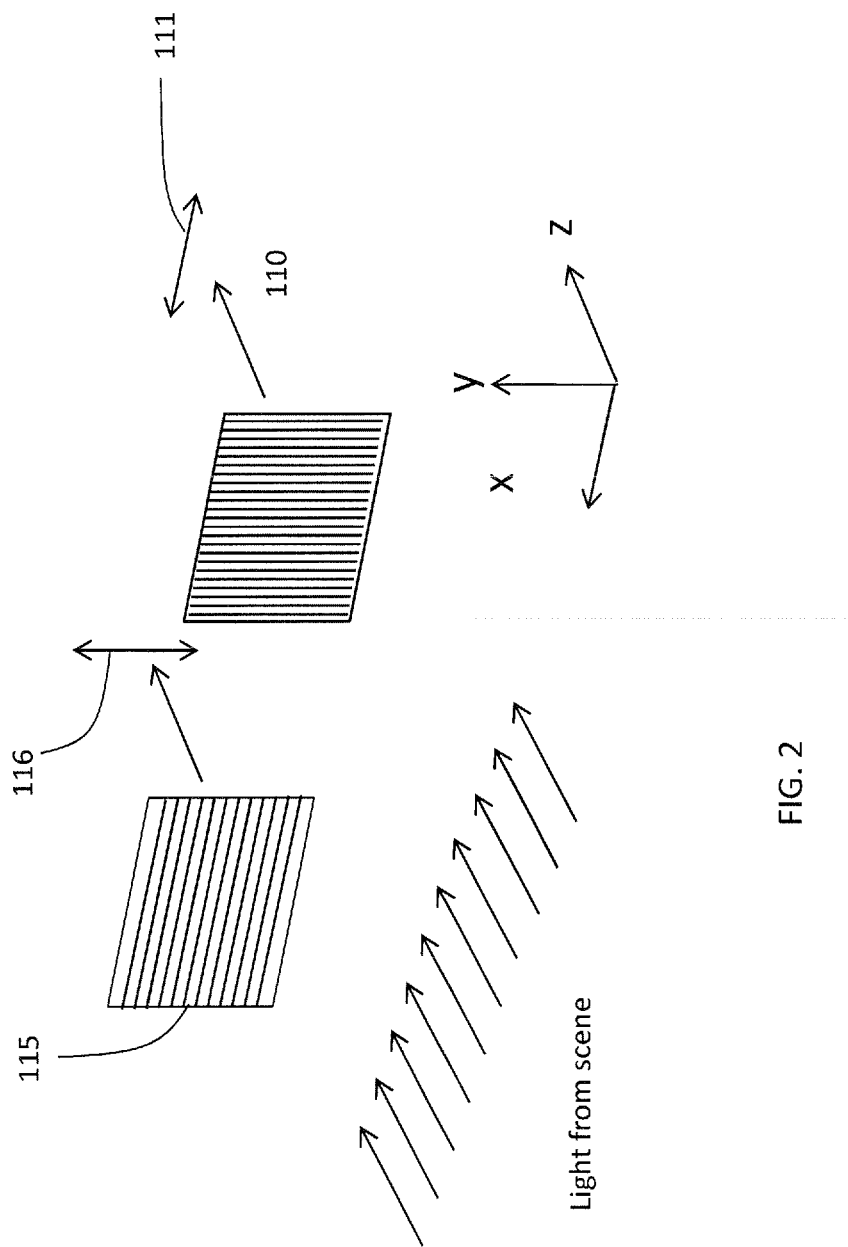
FIG. 2 is a conceptual diagram of light rays passing through two orthogonally arranged modulation patterns, showing the direction of modulation in the 3-D digital imaging camera of FIG. 1.

Referring to FIG. 2, a Ronchi screen is a grating pattern which has opaque and clear lines. For example, with reference to an x-y-z coordinate axis, z-transmitted (e.g., horizontally transmitted) light passing through the Ronchi screen 115 arranged in the x-y plane with grid lines arranged in the x-direction, will be modulated in the y-direction 116 (e.g., vertical direction). Similarly, the Ronchi screen 110 with lines arranged vertically (i.e., the y-direction) will modulate light passing through in the x-direction 111 (i.e., horizontally). The Ronchi screens 110, 115 may be thus arranged in the camera 100 with the lines in the Ronchi screen 110 perpendicular to the lines in the Ronchi screen 115.

The filter 109 may be placed directly adjacent to the lens 105, or directly adjacent to an iris aperture 120a, as shown in FIG. 1. However, there may be other locations for the filter that are acceptable, however, image reversal may occur in the optical system, depending on details of design, and the nomenclature defined herein may be revised accordingly.

Additionally, there may be other locations for the iris aperture, such as iris aperture 120b, as shown in FIG. 1, where the lens 105 is a compound lens, and the iris aperture 120b is located within the compound lens. The lens 105 produces a focused image at an image focal-plane, where an image detector element 130 may be placed in a path of light rays emerging from the lens 105. The image detector element 130 may be, for example, a CMOS, CCD, phototransistor, or other type of imaging device comprising an array of pixel sensors. The image detector element 130 may be a color image detector, including a mosaic color pixel array, in which case a single image detector element may be sufficient. If the image detector element 130 is employed to detect monochromatic images, a three color beam splitter prism (not shown) may be used to direct light in three separate colors (e.g., red/green/blue, or RGB) to three separate image detector elements 130, where each image detector element 130 is to be located at the image focal plane of the lens 105. Without loss of generality, the simplified arrangement in FIG. 1 adequately describes the features and 3-D operation of the camera.

The image detector element 130 may provide input signals to a general image processor 150, which is conventionally concerned with processing chroma, luminance, etc., related to standard image processing that ultimately results in a stream of image output signals that constitute frames of a video stream. The operation of the general image processor 150 depends on a knowledge of the scanning and read-out scheme employed to operate the image detector element.

The Ronchi patterns 110, 115 separately modulate in orthogonal directions (x or y) light passing through the lens from the two separate views. Images from both views overlap and are received by the image detector element 130 in the image plane of the lens 105. Each image is modulated in a direction orthogonal to the other, due to the orthogonal orientation of the Ronchi patterns 110, 115.

In one embodiment of the camera 100, the output signals from the general image processor 150 may be further processed in accordance with the operational properties of the image detector element 130 to be described below to enable generation of signals incorporating 3-D properties.

The signals output from the general image processor 150 may then be further processed by a 3-D processor 160, which may be a separate physical unit, or a subsystem within the general image processor 150, providing the processing operations to decode the two orthogonally modulated images incident on the 3-D image detector element 130. The 3-D processor 160 may split the output of the general image processor 150 into two substantially identical streams. Each stream may be obtained by demodulation decoding of the frames in one or the other of the two orthogonal modulation directions and spatially low-pass filtering the images. The spatial demodulation of the two images requires that the 3-D processor have "knowledge" of the spatial modulation induced by the Ronchi patterns 110, 115. This process recovers two images of the scene viewed by the camera from two viewing angles due to the parallax induced by the division of an input to the lens 105 into substantially two separate portions by the two orthogonally arranged Ronchi patterns 110, 115 (e.g., "left" and "right").

Figure 3:
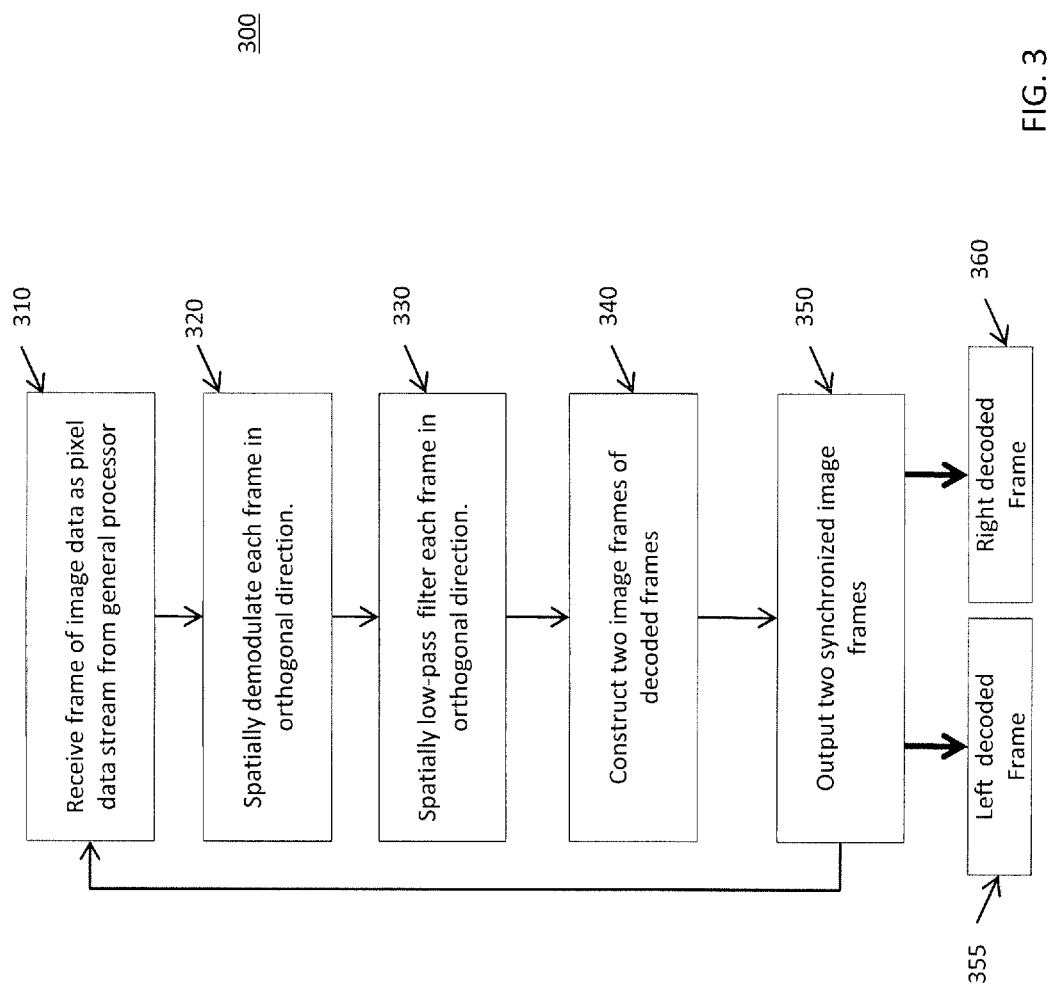
FIG. 3 is a block diagram of an embodiment of a method to decode two modulated images as received through a single lens camera in accordance with the disclosure.

FIG. 3 illustrates a method 300 of the 3-D processor 160 decoding the signals received from the general image processor 150 to provide the two images of the scene as viewed from two viewing angles. First, in process block 310 the 3-D processor 160 receives a data frame from the general image processor 150, in which a string of data contains typical parameters for each pixel in the image detector 130. Typical parameters may include at least chroma and luminance for each pixel.

At this point, the frame contains combined data of two parallax views of a scene that has been spatially modulated in two orthogonal directions (e.g., horizontally and vertically by the two Ronchi patterns 110, 115). In process block 320 the 3-D processor constructs two data streams of the entire frame and spatially demodulates each frame separately—one frame in the x-direction, the other frame in the y-direction, corresponding to the modulation direction of each of the Ronchi patterns 10 and 115. In process block 330 each frame is then low-pass filtered to remove all modulation effects. What results, in process block 340, are two frames, where each frame corresponds to the scene viewed through the portion of the lens 105 viewing through the corresponding Ronchi pattern 110, 115, decoded. In process block 350 the two frames are output synchronously into two streams of image frames, one stream for each view, e.g., a left decoded frame 355 and a right decoded frame 360.

In a further aspect of the disclosure, the embodiments described with reference to FIG. 1 may be further adapted to provide variable image convergence, or "toe-in." Increasing the image convergence give the effect of projecting a viewed image farther in front of the screen, and closer to the viewing observer, thus dramatically enhancing the effect of 3-D depth perception. The following description is presented with reference to the embodiment in FIG. 1, although the same principals of convergence may be applied equally for both color mosaic image detector elements and image detector elements receiving monochromatic images via a color beam splitter.

FIG. 4 shows an image detector element 130. The arrangement of all optical elements preceding and conducting light rays to the image detector element 130 are configured to fill the entire array of pixel sensors 495 in the image detector element 130. If the two streams of frame data 355 and 360 are read out from the entire array of pixels 495, the center of each image (e.g., "left" and "right") frame is at the center of the image detector element 130. However, if the "left" image is formed by reading out a subset of pixels 495-1 in the image detector element 130 that is to the left of the pixel array center, and the "right" image is formed by reading out a subset of pixels 495-r in the image detector element 130 that is to the right of the pixel array center, then the view presented in each read-out subset is shifted away from the center of the image detector element 130. By spreading the effective separation of the center of the two images farther apart in this way, a person viewing these images separately with each eye will perceive increased parallax and more severe convergence of the two images, giving the impression of a perceived closer object. For an observer viewing the two images separately with each eye, convergence, or "toe-in" of the two images to appear as one will give the impression of increased parallax, and the image will be perceived as having been moved closer to the viewer and farther in front of the screen, at location 499. Instead of the effect being achieved by two cameras (or two lens systems) coordinated to "toe-in" as an object approaches the cameras, the "toe-in" can be achieved electronically by controlling a displacement offset of the subsets of images from the center of the original entire image. (Because the human eyes are arranged horizontally, 3-D depth perception is caused by parallax in the horizontal direction. No vertical parallax is considered.)

The 3-D processor 160 may perform this shifting of the "left" and "right" image within the output data frame dynamically to intentionally alter the perceived field depth, or the convergence may be determined statically for a constant shift of the perceived image field. In the dynamic case, the 3-D processor 160 may make this convergence alteration on the basis of data provided corresponding to scene information, such as autofocus, manual focus, editing input, or other mechanical or electronic controls.

As described above, the 3-D processor 160 also demodulates and low pass filters the two modulated views (horizontally and vertically) to extract and separately obtain the two views passing separately through the two Ronchi patterns 110, 115.

It is understood that any specific order or hierarchy of steps described in this method is being presented to provide an example of the operation of the 3-D processor in a camera. Based upon design preferences, it is understood that the specific order or hierarchy of steps may be rearranged. In addition, it is understood that any step may be omitted and/or additional steps not disclosed herein can be included, all while remaining within the scope of the invention.

The various electronic components of the camera described thus far may be implemented as hardware, software, or combinations of both. Whether such components are implemented as hardware or software depends upon the particular application and design constraints imposed on the overall system. Skilled artisans may implement the described components in varying ways for each particular application. By way of example, each component, or any combination of components, may be implemented with one or more microprocessors, microcontrollers, digital signal processors (DSPs), field programmable gate arrays (FPGAs), programmable logic devices (PLDs), controllers, state machines, gated logic, discrete hardware components, or any other suitable circuits that can perform the various functionalities described throughout this disclosure, or any combination thereof.

Various components (e.g., microprocessor) may be configured to execute software. Software shall be construed broadly to mean instructions, data, or any combination thereof, whether referred to as software, firmware, middleware, microcode, hardware description language, or otherwise. The software may be stored on machine-readable media. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium for storing non-transient data, or any combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of imaging comprising;
receiving an optical image from two viewing angles within a single lens at an image detector;
converting the optical image into two images with orthogonally modulated patterns by amplitude modulating the optical image from a first viewing angle with a first Ronchi pattern and amplitude modulating the optical image from a second viewing angle with a second Ronchi pattern arranged orthogonally to the first Ronchi pattern, wherein the two images overlap and are received by the image detector;
outputting a single signal representing a single frame comprising the two images received by the image detector; and
distinguishably detecting the two orthogonally modulated images in the single frame by demodulation decoding the frame using a first orthogonal modulation to generate a first video signal corresponding to a first viewing angle and demodulation decoding the frame using a second orthogonal modulation to generate a second video signal corresponding to a second viewing angle.

2. The method of claim 1, wherein the first and second orthogonally arranged Ronchi patterns are in front of the lens.

3. The method of claim 1, where the optical image comprise one or more color images.

4. The method of claim 3, further comprising:
separating the one or more color images into a plurality of complementary color monochrome images; and
directing the separated complementary color monochrome images to corresponding separate image detector elements.

5. The method of claim 1, wherein the two orthogonally modulated images are distinguishably detected using the image detector.

6. The method of claim 5, further comprising the image processor:
constructing two output signals corresponding to each of the two orthogonally decoded images.

7. The method of claim 6, wherein each of the modulated images are decoded by demodulation in the same direction of modulation; and by lowpass filtering the demodulated signal.

8. The method of claim 6, wherein the two output signals are each a subset of the two orthogonally decoded images.

9. The method of claim 8, further comprising:
dynamically shifting a center of each of the two output signals including controlling a displacement offset of the subsets of images from the center of the entire image.

10. A camera comprising:
a lens configured to receive an optical image from two viewing angles;
a filter configured to convert the optical image into two orthogonally modulated images by amplitude modulating the optical image from a first viewing angle with a first Ronchi pattern and amplitude modulating the optical image from a second viewing angle with a second Ronchi pattern arranged orthogonally to the first Ronchi pattern, wherein the two images overlap;
an image detector configured to receive the two images and distinguishably detect the two orthogonally modulated images in a single frame, wherein the image detector is configured to output a single signal representing a single frame comprising the two images; and
an image processor configured to distinguishably detect the two orthogonally modulated images in the single frame by demodulation decoding the frame using a first orthogonal modulation to generate a first video signal corresponding to a first viewing angle and demodulation decoding the frame using a second orthogonal modulation to generate a second video signal corresponding to a second viewing angle.

11. The camera of claim 10, wherein one of the modulated images corresponds to the optical image received by the lens from one of the viewing angles, and the other one of the modulated images corresponds to the optical image received by the lens from the other one of the viewing angles.

12. The camera of claim 10, wherein the filter comprises a pair of orthogonally arranged Ronchi patterns.

13. The camera of claim 12, wherein the pair of orthogonally arranged Ronchi patterns are in front of the lens.

14. The camera of claim 10, wherein the image detector comprises at least one of a CMOS array, a CCD array and a phototransistor array.

15. The camera of claim 10, wherein the image detector comprises a color image detector.

16. The camera of claim 15, further comprising a color separating beam splitter configured to separate the optical image into a plurality of monochrome color images, and wherein the image detector comprises a corresponding plurality of image detector elements, each of the image detector elements being configured to receive a different one of the color images.

17. The camera of claim 10, wherein the image detector comprises at least one or more image detector elements each comprising an array having a plurality of sensor pixel segments.

18. The camera of claim 10, wherein the image processor is further configured to dynamically shift a center of each of the two video signals to provide variable image convergence.

19. A camera comprising:
a lens configured to admit light rays from a scene, the lens having a left portion and a right portion, wherein the left and right portions have the same correspondence as a viewer's left eye and right eye;
a pair of orthogonal modulators corresponding to the left and right lens portions arranged with the lens to bifurcate the light rays into a left group and a right group of two orthogonally modulated groups of rays by amplitude modulating the optical image from a first viewing angle with a first Ronchi pattern and amplitude modulating the optical image from a second viewing angle with a second Ronchi pattern arranged orthogonally to the first Ronchi pattern;
an image detector configured to output a signal representing a frame comprising light rays received after passing through the first Ronchi pattern and light rays passing through the second Ronchi pattern; and an image processor configured to decode the two orthogonally modulated groups of rays in the single frame into two video signals, a first video signal corresponding to the light rays admitted to the left portion of the lens and a second video signal corresponding to the light rays admitted to the right portion of the lens by demodulation decoding the frame using a first orthogonal modulation to generate the first video signal corresponding and demodulation decoding the frame using a second orthogonal modulation to generate the second video signal corresponding to a second viewing angle.

20. A camera comprising:

means for receiving an optical image from two viewing angles in a single lens at an image detector;

means for converting the optical image into two orthogonally modulated images by amplitude modulating the optical image from a first viewing angle with a first Ronchi pattern and amplitude modulating the optical image from a second viewing angle with a second Ronchi pattern arranged orthogonally to the first Ronchi pattern, wherein the two images overlap and are received by the image detector; and means for outputting a single signal representing a single frame comprising the two images received by the image detector;

means for distinguishably detecting the two orthogonally modulated images in the single frame by demodulation decoding the frame using a first orthogonal modulation to generate a first video signal corresponding to a first viewing angle and demodulation decoding the frame using a second orthogonal modulation to generate a second video signal corresponding to a second viewing angle.

\* \* \* \* \*